UNITED STATES PATENT OFFICE.

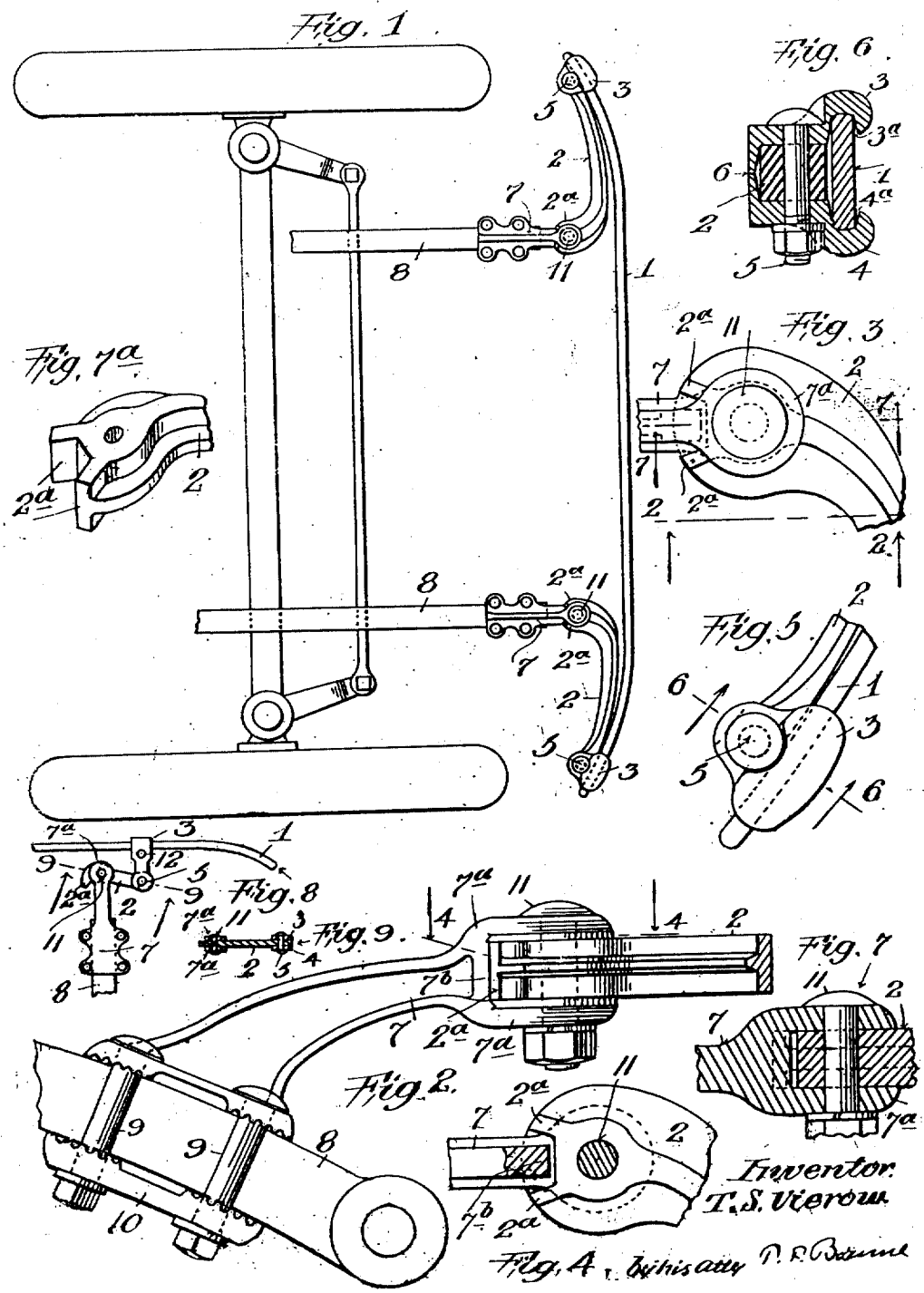

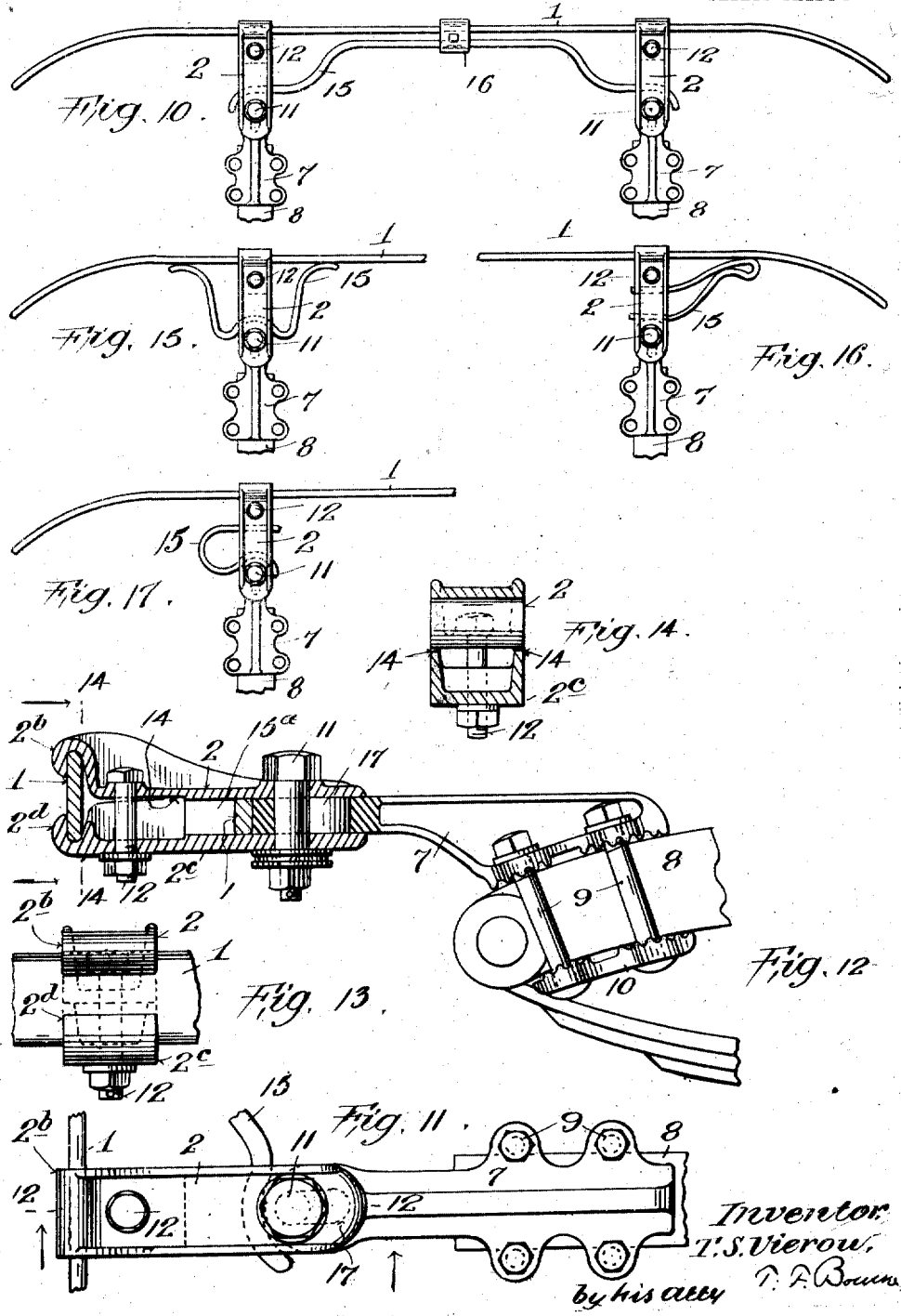

THOMAS S. VIEROW, OF JERSEY CITY, NEW JERSEY.

BUMPER FOR AUTOMOBILES.

1,251,600.	Specification of Letters Patent.	Patented Jan. 1, 1918.

Application filed April 17, 1917. Serial No. 162,638.

*To all whom it may concern:*

Be it known that I, THOMAS S. VIEROW, a citizen of the United States, and resident of Jersey City, in the county of Hudson and State of New Jersey, have invented certain new and useful Improvements in Bumpers for Automobiles, of which the following is a specification.

My invention relates to improvements in bumpers or buffers adapted to be attached to motor vehicles, to protect the motor vehicle as well as objects that may be struck by the bumper. One of the objects of my invention is to provide a simple, cheap and efficient bumper or buffer which will not be liable to be injured by ordinary or relatively light shocks or thrusts against the same, and which will be efficient in resisting such light as well as heavier shocks without materially damaging the bumper.

Another object of my invention is to provide a bumper having a main resilient bumper bar so supported that it may bend when subjected to relatively light thrusts or shocks, and whereby when subjected to heavier thrusts or shocks the bar may become more rigid under the strain imposed thereon without injury to the bar, since such supporting means may move in a manner to prevent undue straining of the bar beyond its elastic limit to reduce danger of the bar becoming broken upon impact with an object, and thereby to prevent injury to the vehicle by such object.

Further objects, and details of construction whereby my invention may be carried out, will be more fully hereinafter explained, and then pointed out in the claims.

Reference is to be had to the accompanying drawings forming part hereof, wherein, Figure 1 is a plan view of a portion of a motor vehicle equipped with my improvements, illustrating a form of pivotal supporting means for the bumper bar; Fig. 2 is a side view illustrating a supporting arm for the bumper bar in section, the section being taken substantially on the line 2, 2, in Fig. 3; Fig. 3 is an enlarged detail plan view; Fig. 4 is a detail sectional view substantially on the line 4, 4, in Fig. 2; Fig. 5 is an enlarged detail illustrating a portion of the bumper bar and its supporting means at one end; Fig. 6 is a section on the line 6, 6, in Fig. 5; Fig. 7 is a section substantially on the line 7, 7, in Fig. 3; Fig. 7ª is a detail perspective of an end portion of one of the supporting arms for the bumper bar; Fig. 8 is a detail of a modified form of pivotal supporting means for the bumper bar; Fig. 9 is a section on the line 9, 9, in Fig. 8; Fig. 10 is a plan view of my improved bumper illustrating pivotal and slidable supporting means for the bumper-bar; Fig. 11 is an enlarged plan view of part of Fig. 10; Fig. 12 is a side view of Fig. 11 partly in section on the line 12, 12, in Fig. 11; Fig. 13 is an end view of Fig. 12; Fig. 14 is a section on the line 14, 14, in Fig. 12; and Figs. 15, 16 and 17 illustrate modified forms of springs to coöperate with the form of bumper illustrated in Fig. 10.

Similar numerals of reference indicate corresponding parts in the several views.

The numeral 1 indicates a bumper bar adapted to be supported in front of a motor vehicle, or on any other suitable part thereof. At 2 are supporting arms for the bumper bar. I have shown two arms 2 spaced along the bar at suitable distances apart, which arms are pivotally supported upon the motor vehicle to limit longitudinal or axial displacement of the bar and to permit the bar to move relatively to the axis of the pivots when meeting an obstruction, the pivotally supported arms normally retaining the bar in proper position on the vehicle. In the form of my invention illustrated in Figs. 1 to 9, the arms 2 are pivotally connected with the bar 1, and also pivotally connected with the vehicle, whereas in the other figures of the drawings the arms 2 are shown rigidly connected to the bar and pivotally connected to the vehicle. To adjustably securely and pivotally connect the outer ends of arms 2 to bar 1, I have shown clamping members 3, 4 (Figs. 1, 5, 6 and 8) having opposing jaws 3ª, 4ª, to grip bar 1, and secured in position by bolt 5 or 12, the rearward edges of the members 3, 4, abutting at 6 (Fig. 6) whereby said members may be securely retained on the bar in spaced relation to receive the adjacent end of arm 2 therebetween, bolt 5 passing through an opening in said arm for pivotally supporting the adjacent part of the bar upon the arm (Fig. 6). The arms are shown similar in construction but projecting in opposite directions from the vehicle. The opposite ends of arms 2 are shown pivotally supported on brackets 7, which are adapted to be secured in any suitable manner upon the forks 8, or other suitable portion of the frame of the vehicle. I have shown the brackets 7 provided with holes adapted to receive bolts 9 coöperating with clamp plates 10 for securing the brackets 7 rigidly in desired adjusted position on the vehicle. The brackets 7 are shown provided with spaced jaws 7$^a$, movably receiving the end of the adjacent arm 2 therebetween, pivot bolt 11 passing through such jaws and arm for pivotally supporting the arm upon the bracket (Fig. 7). To limit swinging or pivotal movement of arms 2 relatively to their corresponding brackets 7, stops are provided therebetween. In the form shown in Figs. 1 to 7$^a$ the arms 2 are provided with spaced stops 2$^a$ on opposite sides of a portion 7$^b$ of a corresponding bracket 7 to engage the latter to limit pivotal movement of the arm in one or another direction, and to permit the arm to have free pivotal movement relatively to the bracket for a suitable distance. By preference, bar 1 may be made of resilient material, such as spring steel, and preferably deeper than wide, to bend under relatively light thrusts or blows. With the two arms secured to the bar at spaced distances thereon, and pivotally supported upon the vehicle, the bar will be maintained in the proper position under normal conditions, and endwise displacement of the bar will be limited by said arms. When the bar meets an obstruction the bar may bend toward the vehicle but its bending movement, in the form shown in Fig. 1, will be limited by engagement of the bar with one or both of the arms 2 and the latter may swing as required upon the corresponding pivot 11, as well as upon the pivot or pivots, 5, whereby the bar is relieved from undue strain. If the thrust be relatively great, the metal of the bar will not be overstrained to a fracturing point, because the arms 2 may continue to swing on their pivots, relieving elongating strain on the bar, whereby the danger of the bar becoming permanently bent or set in a bent condition is reduced or avoided. When the thrust is relieved or removed the bar may spring back to its normal position, the arms 2 turning properly upon their pivots.

While in the form shown in Figs. 1 to 5 the arms 2 are illustrated as somewhat curved and lying quite close to the inner faces of bar 1, in position to resist bending of the bar by relatively light thrusts, I have, in Figs. 8 and 9, illustrated a construction in which arms 2 are spaced farther from bar 1, the members 3, 4, for each arm being longer than those shown in Figs. 1, 5 and 6, and secured together by a separate bolt 12, the pivot bolt 5 pivotally connecting said members with arm 2, the latter being pivotally connected by pivot bolt 11 with bracket 7. A stop 2$^a$ upon arm 2 is adapted to encounter bracket 7 after the arm has been swung by reason of thrust a corresponding distance. The substantial extension of members 3, 4, from bar 1 and the rigid connection of said members to said bar affords a means to provide increased leverage between the bar and the corresponding arm 2 to resist thrust upon the bar.

In the form shown in Figs. 10 to 17 the arms 2 are connected rigidly to bar 1 and the pivot bolts 11 are slidably supported by brackets 7 so that the arms may swing and slide relatively to the brackets. The arms 2 are shown provided with jaws 2$^b$ at their ends (Figs. 12 and 13) to receive bar 1, and a supplemental arm 2$^c$ is beneath each arm 2 and provided with a jaw 2$^d$ to receive bar 1. The arms 2, 2$^c$ are clamped securely together upon bar 1 by means of bolt 12, and stops 14 coöperative between said arms retain them in set position to provide space 15$^a$ therebetween to pivotally and slidably receive the projecting portion of the corresponding bracket 7, and to receive a spring 15. I have shown the stops 14 substantially in the form of webs upon the sides of arm 2$^c$ abutting against an opposing flat portion of arm 2. The spring 15 may be formed in any suitable manner to coöperate with brackets 7 and bar 1, normally tending to move said bar laterally or away from the vehicle to resist thrusts. In Fig. 10 a single spring 15 is provided, its end portions opposing the corresponding adjacent brackets 7 and the central portion being secured by a suitable adjustable clamp 16 to bar 1. In Figs. 15, 16 and 17 separate springs are used for each bracket 7 and corresponding arm 2, said springs bearing against the bracket and against bar 1, each spring independently resisting thrust of the bar and normally tending to move the bar in a direction away from the vehicle. The brackets 7 are shown provided with longitudinally disposed slots 17 slidably receiving the corresponding pivot 11, whereby when bar 1 encounters an object, one or both of said arms 2 and pivots 11 may slide a limited distance along one or both of the brackets 7, and the spring 15 will normally tend to keep the corresponding arm 2 and its pivot 11 pressed outwardly, the outer end of slot 17 limiting the outward movement of the corresponding pivot 11. With the construction described, the bar will be normally maintained in set position in front of the vehicle, with the pivots 11 at the outer portion of the slots 17 of the brackets, and the bar will be maintained in proper position in its longitudinal direction by reason of the rigid connection of arms 2 to the bar, and the spaced relation of said arms and their brackets along the bar in conjunction with the rigid connection of the brackets to the vehicle. When the bar meets an obstruction, it may bend and the arms will turn or swing with respect to their pivots 11 on the brackets, to permit the bar to bend without straining and one or both pivots 11 may slide in the slot 17 of the corresponding bracket or brackets being resisted, however, by spring 15. The bending of bar 1 by reason of thrust against it will resist danger of fracture, as before referred to, and if the bar be struck in the region of arm 2 spring 15 may first resist the impact to an extent limited by the length of slot 17.

A further advantage of my invention is that if the bar be struck adjacent to its end laterally with respect to its pivot 11, the pivotal action of the supporting arms, or the sliding of the pivots, or both, will have the tendency to resist the shock against the bar to prevent fracture of the latter. It will be noted that the pivots 11 are disposed at one side of the longitudinal axis of the bar, so that the latter, thus supported with respect to its pivots, is in a position freely to bend when struck by or when encountering an object, without retardation by its pivots, so that the bar may move relatively to the axis of the pivots to remove strain upon the bar. In accordance with my improvements the bar is supported in a rigid manner without dependence upon springs for its support, since the arms are rigid and yet can swing or turn on their pivots to permit the bar to assume positions adapted to relieve the bar from undue strain to limit danger of breaking or fracture of the bar.

My improved bumper is cheap to manufacture and positive in its action, and the brackets readily may be attached to the vehicle and adjusted to the required position along the bar to accommodate different widths of vehicle frames.

Changes may be made in the details of construction and arrangements of parts set forth, as the same may be varied, within the scope of the appended claims, without departing from the spirit of the invention.

Having now described my invention what I claim is:

1. A bumper for motor vehicles comprising a flexible and resilient bar, and pivotal supporting means pivotally connected adjacent to opposite ends of the bar and pivotally supported between the ends of the bar limiting longitudinal displacement of the bar and permitting the bar and the pivotal means to move relatively to the axes of the pivots.

2. A bumper for motor vehicles comprising a resilient bar, arms pivotally attached at one end to and spaced along the bar, brackets, means pivotally connecting the opposite ends of the arms with the brackets, and means to limit pivotal action of said arms relatively to the brackets, whereby the bar may be supported from the vehicle and longitudinal movement of the bar is limited permitting movement of the adjacent portions of the bar relatively to the corresponding pivots.

3. A bumper for motor vehicles comprising a flexible bar adapted to extend across the vehicle, rigid horizontally disposed arms spaced apart upon the bar, means pivotally connecting the arms with the bar, and means to separately pivotally support said arms upon the vehicle to permit said arms to swing horizontally relatively to the vehicle and to permit adjacent portions of the bar to move relatively to the corresponding pivot and arm.

4. A bumper for motor vehicles comprising a flexible and resilient bar adapted to extend across the vehicle, rigid arms spaced apart from the bar and adjustable along the bar and pivotally connected therewith, means to secure said arms in adjusted positions on the bar, brackets, means to pivotally support the arms upon the brackets to permit the bar and arms to move in a horizontal direction, and means to secure said brackets upon the vehicle.

5. A bumper for motor vehicles comprising a resilient bar adapted to extend across the vehicle and to bend in a horizontal direction, rigid arms spaced apart upon the bar and adjustable along the bar, means to secure said arms in adjusted positions on the bar, means to pivotally support said arms to swing horizontally with the bar when the latter bends horizontally, and means to support said pivotal means upon the vehicle.

6. A bumper for motor vehicles comprising a flexible bar adapted to extend across the vehicle, spaced pivotal means connected with the bar, and means to pivotally support said pivotal means upon the vehicle at one side of the longitudinal axis of the bar.

7. A bumper for motor vehicles comprising a resilient bar adapted to extend across the vehicle, arms attached to the bar and extending at an angle to the longitudinal axis thereof, pivotal supporting means for said arms located at one side of the longitudinal axis of the bar, and means to secure the pivotal supporting means upon the vehicle.

Signed at New York city, in the county of New York and State of New York this 16th day of April A. D. 1917.

THOMAS S. VIEROW.

Witnesses:
Lucy M. Vierow,
Beatrice Vierow.